United States Patent
Breit et al.

(10) Patent No.: US 8,412,110 B2
(45) Date of Patent: Apr. 2, 2013

(54) APPARATUS AND METHOD FOR DETERMINING MULTI-ANTENNA RADIATED PERFORMANCE OF WIRELESS DEVICES

(75) Inventors: Gregory A. Breit, San Diego, CA (US); Dennis M. Feenaghty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 12/848,637

(22) Filed: Aug. 2, 2010

(65) Prior Publication Data

US 2011/0081869 A1   Apr. 7, 2011

Related U.S. Application Data

(60) Provisional application No. 61/249,248, filed on Oct. 6, 2009.

(51) Int. Cl.
  *H04B 17/00* (2006.01)
(52) U.S. Cl. .................. 455/67.11; 455/67.13; 455/103; 375/260; 375/299
(58) Field of Classification Search ............... 455/67.11, 455/67.13, 103, 115.1; 375/260, 299, 349
See application file for complete search history.

(56) References Cited

U.S. PATENT DOCUMENTS

| | | | | |
|---|---|---|---|---|
| 6,144,711 | A | * | 11/2000 | Raleigh et al. ................ 375/347 |
| 7,184,713 | B2 | * | 2/2007 | Kadous et al. ............. 455/67.13 |
| 2008/0056340 | A1 | | 3/2008 | Foegelle |

OTHER PUBLICATIONS

International Search Report and Written Opinion—PCT/US2010/051521, International Search Authority—European Patent Office—Feb. 16, 2011.
Pal A, et al., "Effect of antenna element properties and array orientation on performance of MIMO systems", Wireless Communication Systems, 2004, 1st International Symposium on Mauritius Sep. 20-22, 2004, Piscataway, NJ, USA.IEEE, Sep. 20, 2004, pp. 120-124, XP0107807.
Qualcomm et al., "Concept for Multi-Antenna Radiated Performance Test", 3GPP Draft, R4-101311, 3rd Generation Partnership Project (3GPP), Mobile Competence Centre, 650, Route Des Lucioles, F-06921 Sophia-Antipolis Cedex, France, vol. RAN WG4, no Dublin, 20100412, Apr. 9, 2010, XP050427425.

* cited by examiner

*Primary Examiner* — Tuan H Nguyen
(74) *Attorney, Agent, or Firm* — Stanton Braden (57) ABSTRACT

An apparatus and method for determining radiated performance of multiple antennas in a wireless system on the basis of capacity degradation comprising calculating a plurality of normalized IID channel matrices based on a plurality of complex gain patterns; calculating a plurality of colored channel matrices based on the plurality of normalized IID channel matrices; calculating a first channel capacity corresponding to the plurality of normalized IID channel matrices; calculating a second channel capacity corresponding to the plurality of colored channel matrices; and calculating a capacity degradation based on the first channel capacity and the second channel capacity.

16 Claims, 11 Drawing Sheets

CASE 1: [0   0   0   0]    (IDEAL)

CASE 2: [-3   -3   -3   -6]

CASE 3: [-3   -10   -10   -10]

CASE 4: [-6   -10   -10   -10]

|  | R CASE 1 | R CASE 2 | R CASE 3 | R CASE 4 |
|---|---|---|---|---|
| EFF CASE 1 | 1.00 | 0.93 | 0.80 | 0.78 |
| EFF CASE 2 | 0.80 | 0.74 | 0.63 | 0.61 |
| EFF CASE 3 | 0.58 | 0.54 | 0.47 | 0.44 |
| EFF CASE 4 | 0.54 | 0.50 | 0.43 | 0.40 |

APPARATUS AND METHOD FOR DETERMINING MULTI-ANTENNA RADIATED PERFORMANCE OF WIRELESS DEVICES

CLAIM OF PRIORITY UNDER 35 U.S.C. §119

The present Application for Patent claims priority to Provisional Application No. 61/249,248 entitled Apparatus and Method for Determining Multi-Antenna Radiated Performance of Wireless Devices filed Oct. 6, 2009, and assigned to the assignee hereof and hereby expressly incorporated by reference herein.

FIELD

This disclosure relates generally to apparatus and methods for testing of antenna performance. More particularly, the disclosure relates to determining radiated performance of multiple antennas in a wireless system.

BACKGROUND

In many telecommunication systems, communications networks are used to exchange messages among several interacting elements which are separated in space. There are many types of networks which may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for waveform propagation (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a traditional form of communications networks and are typically favored for interconnection of fixed network elements or for bulk data transfer. For example, fiber optic cables are often the preferred transmission media for very high throughput transport applications over long distances between large network hubs, for example, bulk data transport across or between continents over the Earth's surface.

SUMMARY

Disclosed is an apparatus and method for determining radiated performance of multiple antennas in a wireless system. According to one aspect, a method for determining radiated performance of multiple antennas in a wireless system on the basis of capacity degradation comprising calculating a plurality of normalized IID channel matrices based on a plurality of complex gain patterns; calculating a plurality of colored channel matrices based on the plurality of normalized IID channel matrices; calculating a first channel capacity corresponding to the plurality of normalized IID channel matrices; calculating a second channel capacity corresponding to the plurality of colored channel matrices; and calculating a capacity degradation based on the first channel capacity and the second channel capacity.

According to another aspect, an apparatus comprising a processor and a memory, the memory containing program code executable by the processor for performing the following: calculating a plurality of normalized IID channel matrices based on a plurality of complex gain patterns; calculating a plurality of colored channel matrices based on the plurality of normalized IID channel matrices; calculating a first channel capacity corresponding to the plurality of normalized IID channel matrices; calculating a second channel capacity corresponding to the plurality of colored channel matrices; and calculating a capacity degradation based on the first channel capacity and the second channel capacity.

According to another aspect, an apparatus for determining radiated performance of multiple antennas in a wireless system on the basis of capacity degradation comprising means for calculating a plurality of normalized IID channel matrices based on a plurality of complex gain patterns; means for calculating a plurality of colored channel matrices based on the plurality of normalized IID channel matrices; means for calculating a first channel capacity corresponding to the plurality of normalized IID channel matrices; means for calculating a second channel capacity corresponding to the plurality of colored channel matrices; and means for calculating a capacity degradation based on the first channel capacity and the second channel capacity.

According to another aspect, a computer-readable medium storing a computer program, wherein execution of the computer program is for: calculating a plurality of normalized IID channel matrices based on a plurality of complex gain patterns; calculating a plurality of colored channel matrices based on the plurality of normalized IID channel matrices; calculating a first channel capacity corresponding to the plurality of normalized IID channel matrices; calculating a second channel capacity corresponding to the plurality of colored channel matrices; and calculating a capacity degradation based on the first channel capacity and the second channel capacity.

Advantages of the present disclosure include providing a simple metric of radiated performance in a wireless system distinct from conducted performance.

The features, nature, and advantages of the present disclosure will become more apparent from the detailed description set forth below when taken in conjunction with the drawings.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
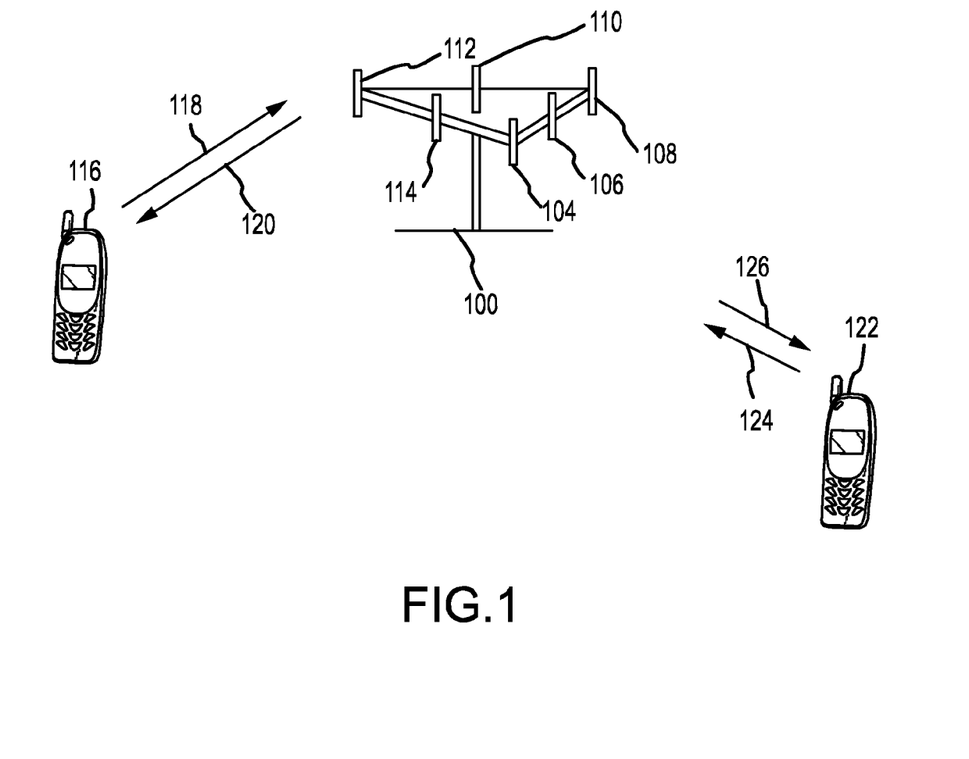
FIG. 1 illustrates an example multiple access wireless communication system according to one example.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an eNodeB or some other terminology. An access terminal may also be called a mobile terminal, a mobile device, a user equipment (UE), a wireless communication device, terminal, access terminal or some other terminology.

Figure 2:
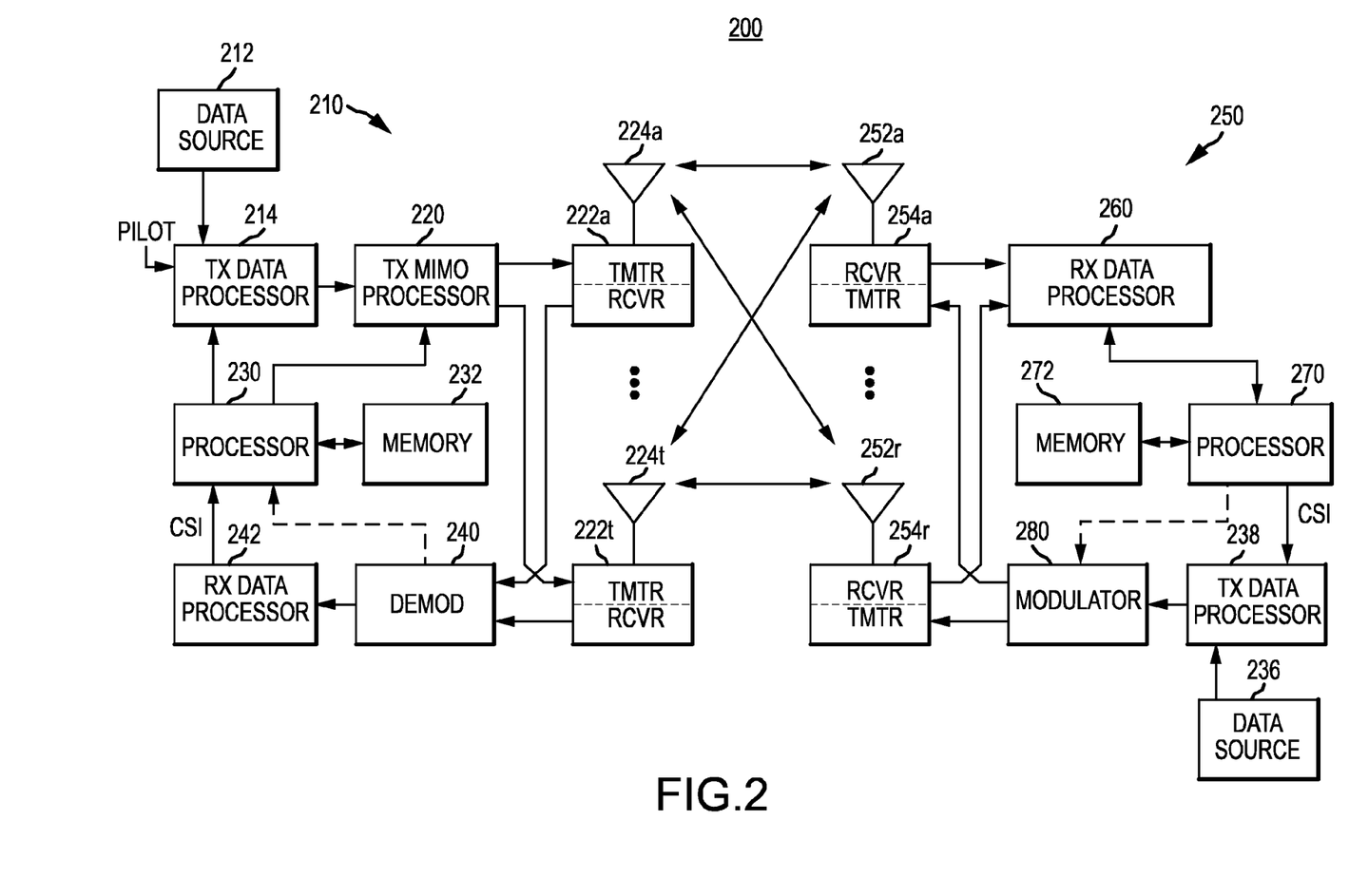
FIG. 2 illustrates an example block diagram of a transmitter system (also known as the access point) and a receiver system (also known as access terminal) in a multiple input multiple output (MIMO) system.

FIG. 2 illustrates an example block diagram of a transmitter system 210 (also known as the access point) and a receiver system 250 (also known as access terminal) in a multiple input multiple output (MIMO) system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 then determines which pre-coding matrix to use for determining the beamforming weights then processes the extracted message.

In some wireless propagation scenarios, communication performance may be degraded by various propagation impairments, for example, multipath distortion or fading. If these propagation impairments are not mitigated, overall communication performance in terms of bit error rate (BER), availability, latency, packet loss rate (PLR), etc. may be severely degraded and user satisfaction would be compromised. One transmission technique that is effective in combating propagation impairments is known as multiple input multiple output (MIMO). In MIMO systems, a transmitter transmits signals over a plurality of transmit antennas and a remote receiver receives these signals with a plurality of receive antennas. By increasing the number of spatial degrees of freedom for the wireless communication system, improved communications performance may be attained.

In an ideal situation, optimal MIMO performance occurs when the plurality of receive antennas are totally uncorrelated. In this ideal case, each receive antenna provides independent information to the receiver, which will improve communication performance. In realistic scenarios, however, the plurality of receive antennas will be partially correlated. In general, a higher correlation coefficient translates into reduced antenna diversity gain. In addition, gain imbalances among the plurality of receive antennas also affect MIMO performance.

There is a need for performance evaluation of a MIMO wireless communication system using a simple metric. The simple metric may be based on the receive antenna correlation and gain imbalance properties which are multidimensional, due to the plurality of receive antennas. In one example, the present disclosure describes creating a single figure of merit for an arbitrary number of receive antennas which is a function of pairwise correlation coefficients and pairwise gain imbalances. This figure of merit is based on the MIMO channel capacity equation.

In one aspect, the radiated performance of dual-antenna devices may be assessed through two parameters: antenna correlation and antenna efficiencies. Alternatively, antenna efficiency may be expressed as the efficiency of the primary antenna and the imbalance between primary and diversity antennas. The parametric assessment may provide a complete picture of radiated performance in conjunction with existing total isotropic sensitivity (TIS) and total radiated power (TRP) techniques. In one aspect, radiated performance is decoupled from RF and baseband conducted performance.

In one example, new performance assessment techniques are needed for imminent MIMO systems. For example, current proposals in the 3GPP system blur the line between radiated and conducted performance. In addition, evaluation of current methodology indicates that existing techniques are not easily extendable to more than two antennas. For example, in the case of more than two antennas, antenna correlation becomes a matrix and there is no longer a single imbalance to evaluate (i.e. there is a vector of efficiencies).

In addition to proposing evaluation of the individual metrics of antenna correlation and gain imbalance, there have been alternative proposals to measure MIMO throughput as a figure of merit for radiated performance of a MIMO device. Such an approach is undesirable since it does not isolate the performance of the antenna subsystem (which is ostensibly the target of the radiated performance test) from the conducted performance of the baseband modem (which is already evaluated through a series of cabled performance tests). The present disclosure produces a figure of merit which depends only on the critical performance parameters of the antenna subsystem.

The present disclosure describes a technique by which certain metrics for antenna performance may be combined into a single figure of merit based directly on expressions used in MIMO channel capacity theory. In one aspect, a summary of the technique is disclosed herein.

Figure 3:
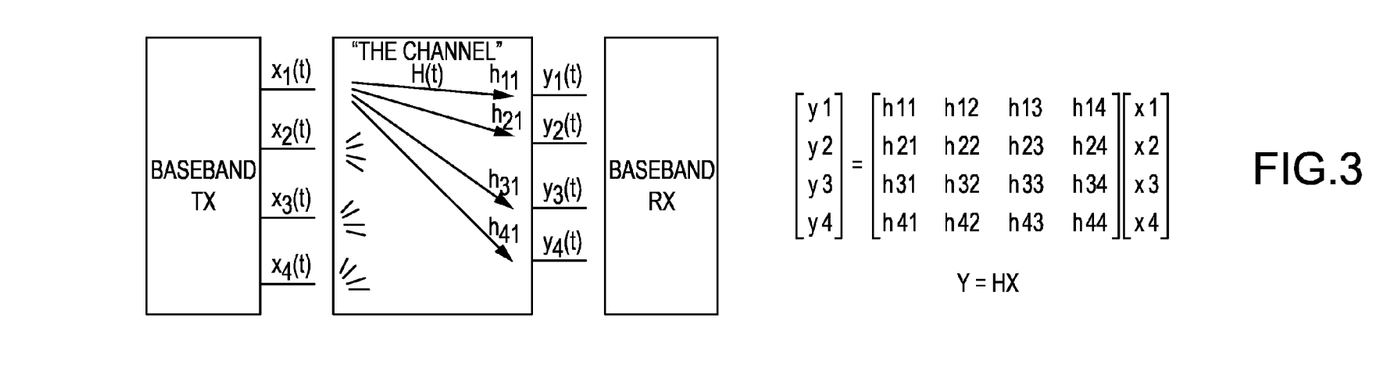
FIG. 3 illustrates a model of an example 4×4 MIMO channel, with four transmit antennas and four receive antennas.

FIG. 3 illustrates a model of an example 4×4 MIMO channel, with four transmit antennas and four receive antennas. In this model, the matrix H represents the transfer function from the transmit vector X to the receive vector Y. In one example, H is a matrix of complex channel gains. In one aspect, the channel may have linear time-variant and time-invariant characteristics. For example, the time-invariant characteristics may include transmit and receive front end sections, antennas, cabling, path loss, etc. Common path loss is typically factored out as a constant since system analysis is usually focused on average signal/noise ratio (SNR) at the receiver. In another example, time-variant characteristics may include multipath fading, shadowing, Doppler shift, etc.

In one example, the mathematical relationship between the transmit vector X and receive vector Y is given by equation (1) below.

$$\begin{bmatrix} y_1 \\ y_2 \\ y_3 \\ y_4 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} x_1 \\ x_2 \\ x_3 \\ x_4 \end{bmatrix} \quad (1)$$

In one aspect, information theory shows that a given MIMO channel matrix H has the following maximum capacity in bits/s/Hz:

$$C = \log_2\left[\det\left(I_{Nrx} + \frac{P}{N_{tx}N_0}HH^*\right)\right] = \log_2\left[\det\left(I_{Nrx} + \frac{SNR}{N_{tx}}HH^*\right)\right] \quad (2)$$

where P is the average received power at the device (neglecting antennas), $N_o$ is the device noise density, $N_{tx}$ is the number of transmit antennas and H* denotes the complex conjugate of H. Typically, $P/N_0$ is combined into an assumed SNR at the receiver incorporating the transmit EIRP, channel path loss, and receiver noise density.

In one example, ideally the receive antennas are perfectly uncorrelated and imparts no additional signal loss. In another example, for a Rayleigh fading channel, H can be modeled as a matrix of independent, identically distributed (IID) complex Gaussian random variables with unity variance if the path loss is factored out. In another example, H is for a Rician fading channel. In one example, this model is known as the IID channel, which may be the most optimistic channel assumption. Typical systems simulations may involve multiple instances, for example thousands, of these random variables to produce a distribution of results over a statistical sampling of the Rayleigh fading channel.

In another example, in an imperfect case, the IID channel is colored by correlation in the receive antenna array plus antenna and cable losses as shown in equation (3) below.

$$H_{colored} = \begin{bmatrix} 1 & \rho_{12} & \rho_{13} & \rho_{14} \\ \rho_{12}^h & 1 & \rho_{23} & \rho_{24} \\ \rho_{13}^h & \rho_{23}^h & 1 & \rho_{24} \\ \rho_{1A}^h & \rho_{2A}^h & \rho_{3A}^h & 1 \end{bmatrix}^{\frac{1}{2}} \begin{bmatrix} \sqrt{\eta_1} & 0 & 0 & 0 \\ 0 & \sqrt{\eta_2} & 0 & 0 \\ 0 & 0 & \sqrt{\eta_3} & 0 \\ 0 & 0 & 0 & \sqrt{\eta_4} \end{bmatrix} \quad (3)$$

$$\begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} =$$

$$\begin{bmatrix} 1 & \rho_{12} & \rho_{13} & \rho_{14} \\ \rho_{12}^h & 1 & \rho_{23} & \rho_{24} \\ \rho_{13}^h & \rho_{23}^h & 1 & \rho_{34} \\ \rho_{14}^h & \rho_{24}^h & \rho_{34}^h & 1 \end{bmatrix}^{\frac{1}{2}}$$

$$\begin{bmatrix} \sqrt{\eta_1}h_{11} & \sqrt{\eta_1}h_{12} & \sqrt{\eta_1}h_{13} & \sqrt{\eta_1}h_{14} \\ \sqrt{\eta_2}h_{21} & \sqrt{\eta_2}h_{22} & \sqrt{\eta_2}h_{23} & \sqrt{\eta_2}h_{24} \\ \sqrt{\eta_3}h_{31} & \sqrt{\eta_3}h_{32} & \sqrt{\eta_3}h_{33} & \sqrt{\eta_3}h_{34} \\ \sqrt{\eta_4}h_{41} & \sqrt{\eta_4}h_{42} & \sqrt{\eta_4}h_{43} & \sqrt{\eta_4}h_{44} \end{bmatrix}$$

where $\rho_{ij}$ is the complex correlation coefficient between receive antennas i & j, $\eta_i$ is the power efficiency of the ith receive antenna, $h_i$ are random complex Gaussian channel coefficients (IID=independent, identically distributed), and "½" represents the matrix square root.

In one aspect, the expression in equation (3) assumes zero correlation in the transmit antenna array. In one example, the channel matrix $H_{colored}$ reduces to $H_{IID}$ when all $\rho=0$ and all $\eta=1$. In one aspect, the correlation $\rho$ and efficiencies $\eta$ can be measured.

The method of applying the matrix square root of the correlation matrix to a Gaussian IID channel is well founded in signal theory, and is a fundamental of the Kronecker MIMO channel model. The diagonal matrix of antenna efficiencies is not commonly seen in the literature (most MIMO simulations assume equal antenna gain across the arrays), but is necessary to account for the different antenna losses observed across the receive antenna array.

In one example, the expression in equation (3) describes how a complex IID (Rayleigh) Gaussian MIMO channel is "colored" by antenna gain (efficiency) across the receive antenna.

In one aspect, the technique described herein accommodates devices with two or more receive antennas. The method described herein may include one or more of the following features:

measures complex gain patterns of all device antennas
  calculates complex antenna correlation coefficient matrix
  calculates efficiency of all antennas
  calculates multiple instances of normalized IID channel matrix
  calculates "colored" channel matrix for each IID iteration, based on correlation matrix and efficiencies
  calculate channel capacity for both sets of channel matrices ($C_{colored}$, $C_{IID}$)
  estimates SNR=($P/N_o$) appropriate to the system link budget
  evaluates performance on the basis of capacity degradation from ideal (IID)

In one example, the present disclosure combines the impact of multiple antenna correlations and efficiencies reduced to a single figure of merit. The present disclosure provides a method and apparatus which is scalable to large antenna arrays of any quantity. In one aspect, the method and apparatus of the present disclosure require minimal or no new measurement methodology beyond current received signal strength indication (RSSI) methodology.

Figure 4:
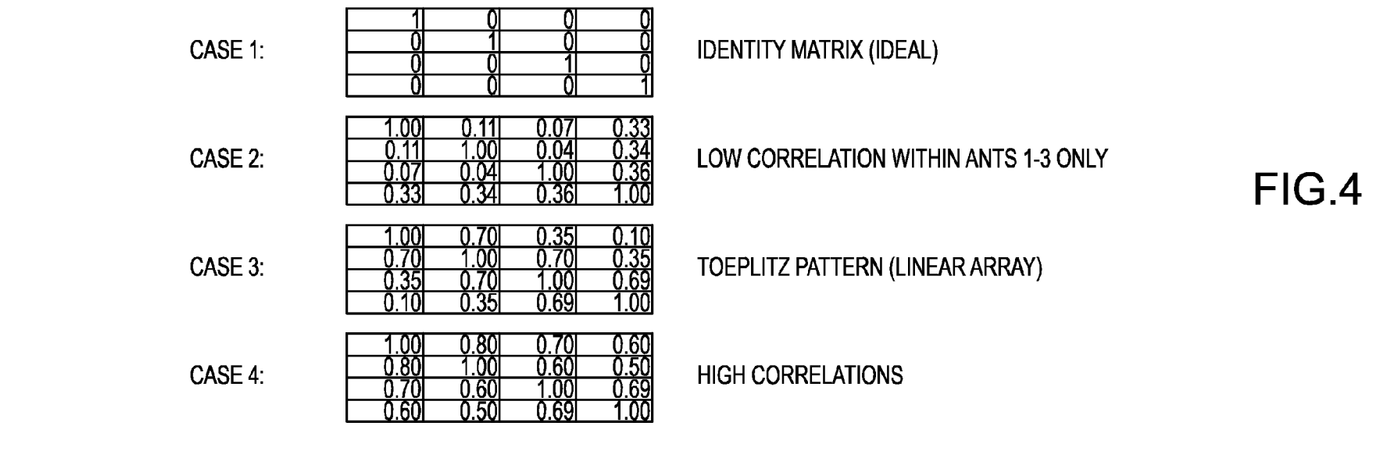
FIG. 4 illustrates example computer simulation test cases for a 4×4 MIMO system with a 20 dB average SNR at the receiver, neglecting the antenna gain.

FIG. 4 illustrates example computer simulation test cases for a 4×4 MIMO system with a 20 dB average SNR at the receiver, neglecting the antenna gain. Shown are four test cases of antenna correlation (normalized to unity for the maximum correlation value). Case 1 is the ideal uncorrelated case, Case 2 is a low correlation case, Case 3 is a Toeplitz pattern case, and Case 4 is a high correlation case.

Figure 5:
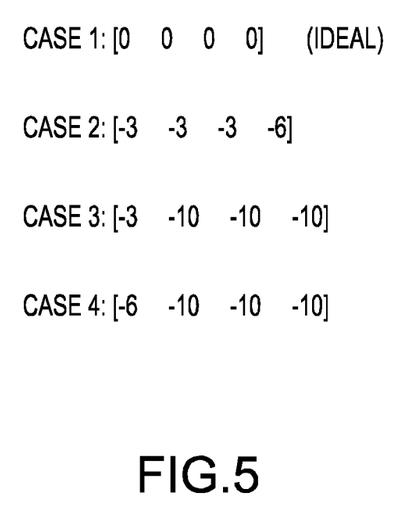
FIG. 5 illustrates an example of four antenna efficiency cases in terms of performance degradation in decibels (dB).

In another example, four antenna efficiency cases are shown in FIG. 5 in terms of performance degradation in decibels (dB).

Figure 6:
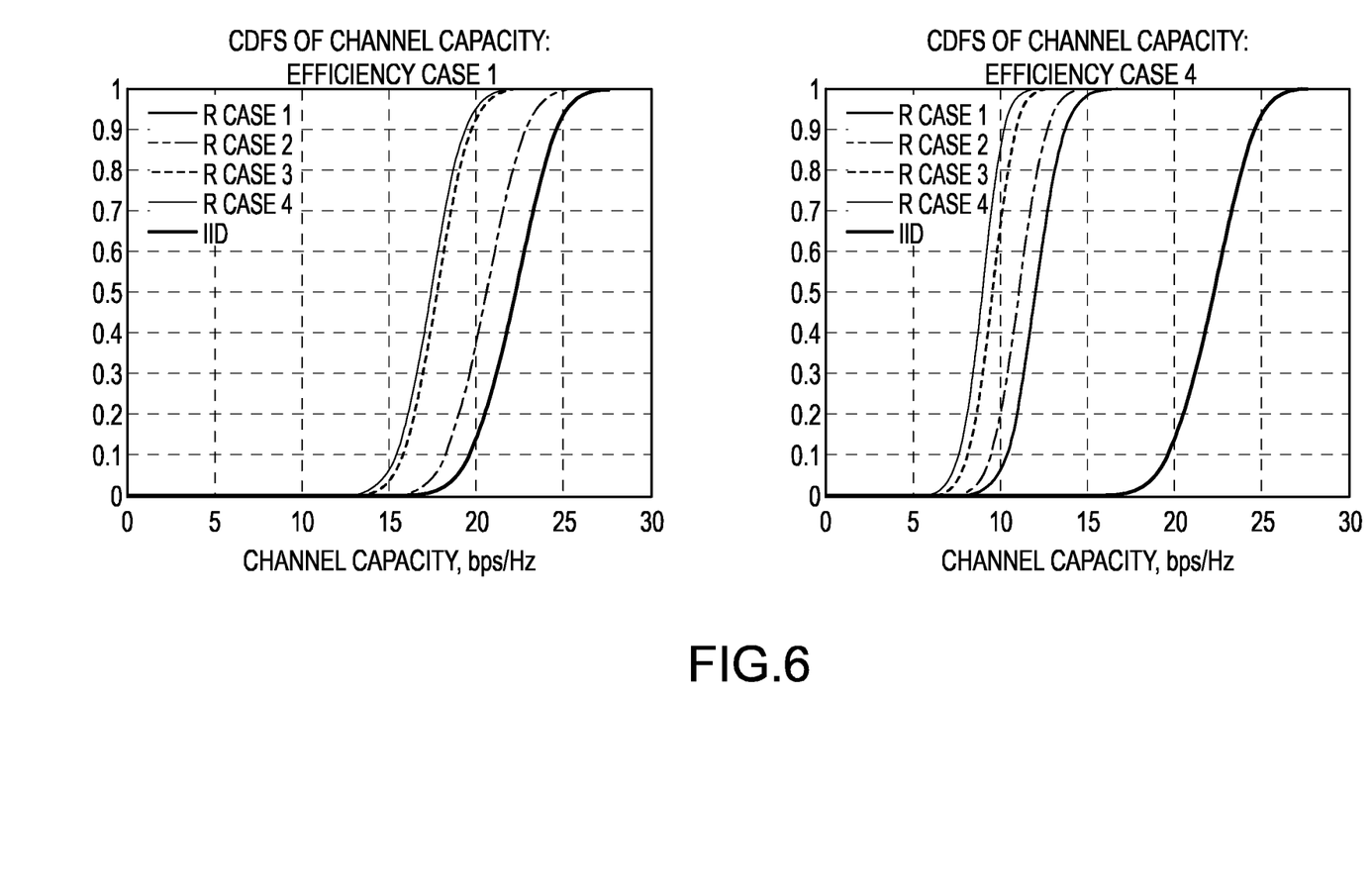
FIG. 6 illustrates the cumulative distribution function (CDF) of channel capacity for each of the four simulated cases shown in FIG. 5, compared to a reference independent identically distributed (IID) case.

FIG. 6 illustrates the cumulative distribution function (CDF) of channel capacity for each of the four simulated cases shown in FIG. 5, compared to a reference independent identically distributed (IID) case. The curves move left with increasing correlation and with decreasing antenna gain.

Figure 7:
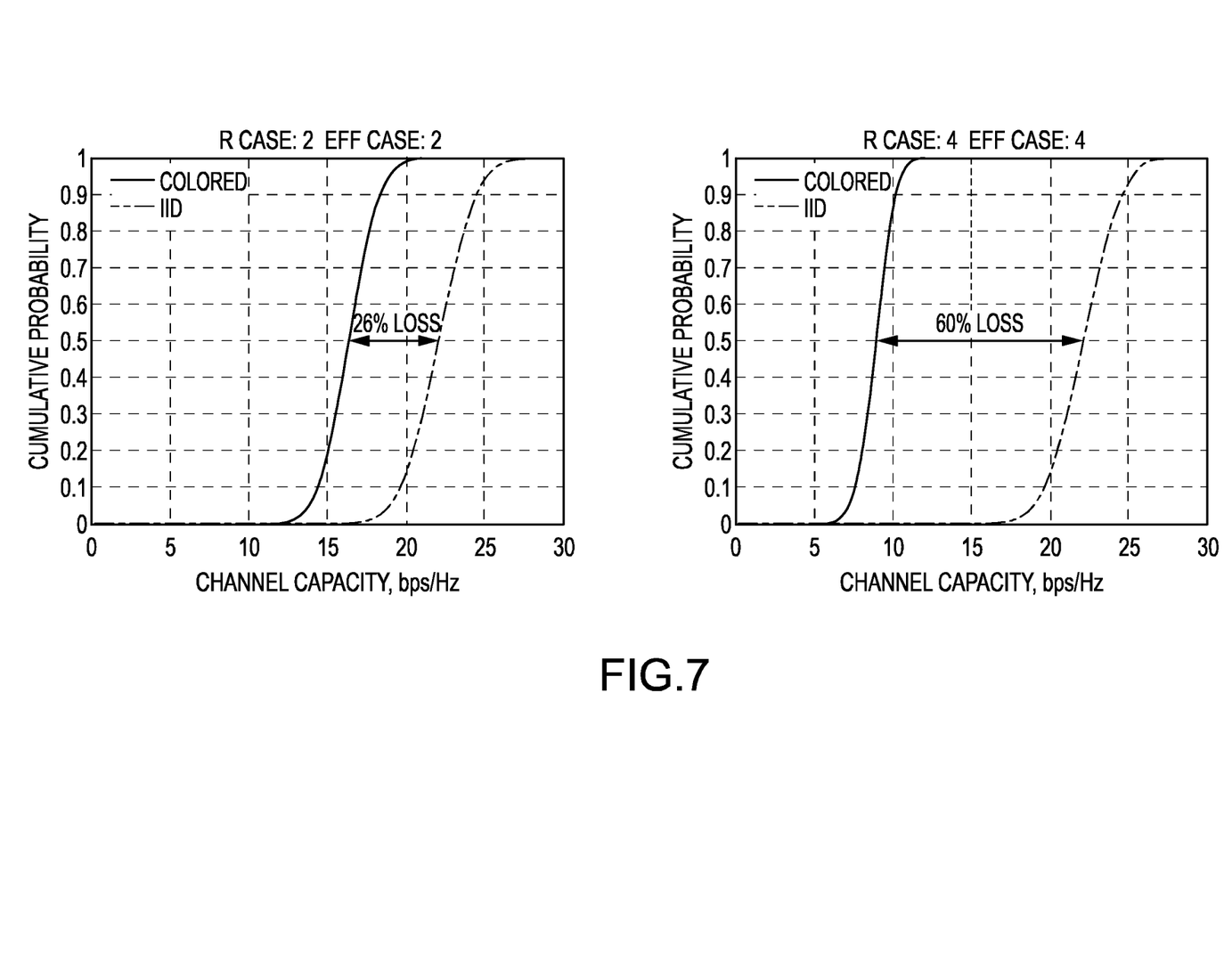
FIG. 7 illustrates the absolute capacity distributions for simulated cases, namely Case 2 and Case 4 shown in FIG. 5, against the reference IID case.

FIG. 7 illustrates the absolute capacity distributions for simulated cases, namely Case 2 and Case 4 shown in FIG. 5, against the reference IID case. In one example, capacity loss is quantified at the 50 percentile point.

Figure 8:
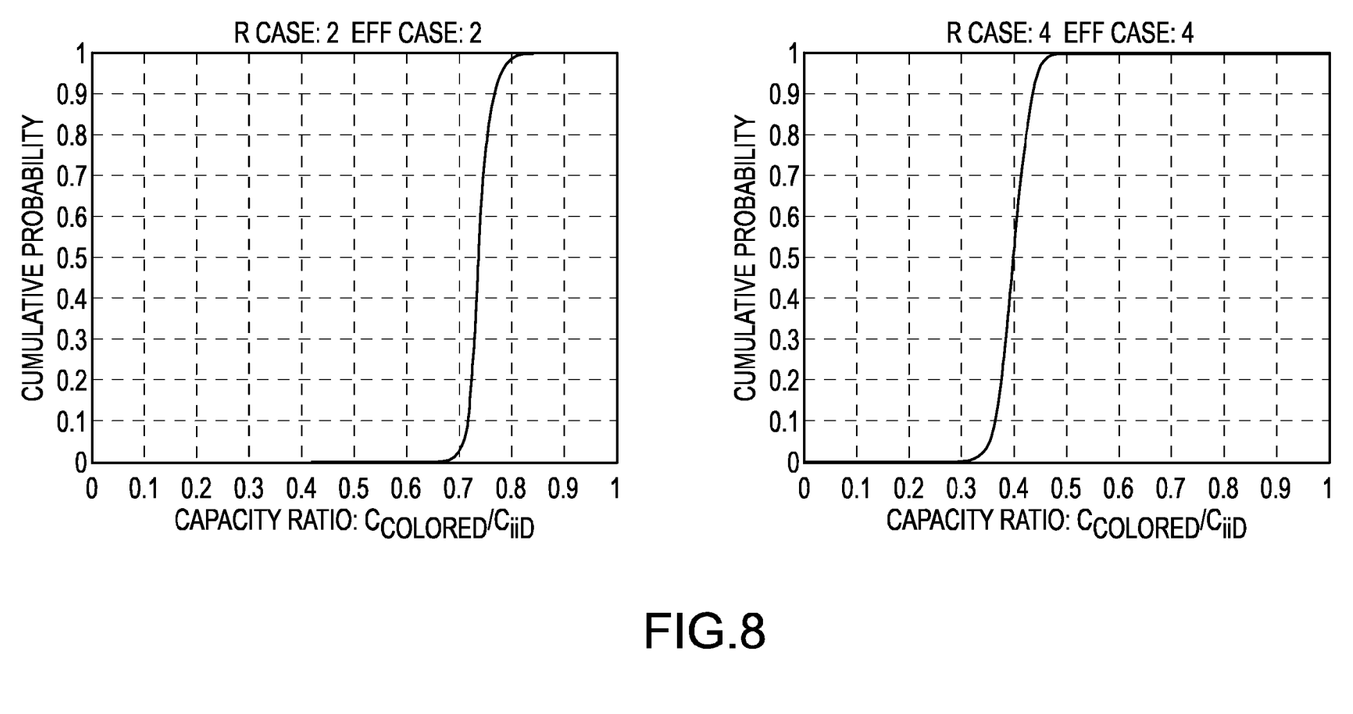
FIG. 8 illustrates the relative capacity loss for certain simulated cases, namely Case 2 and Case 4 shown in FIG. 5, against the reference IID case.

FIG. 8 illustrates the relative capacity loss for certain simulated cases, namely Case 2 and Case 4 shown in FIG. 5, against the reference IID case. In this case, relative capacity is expressed as the ratio of colored capacity to the IID capacity.

Figure 9:
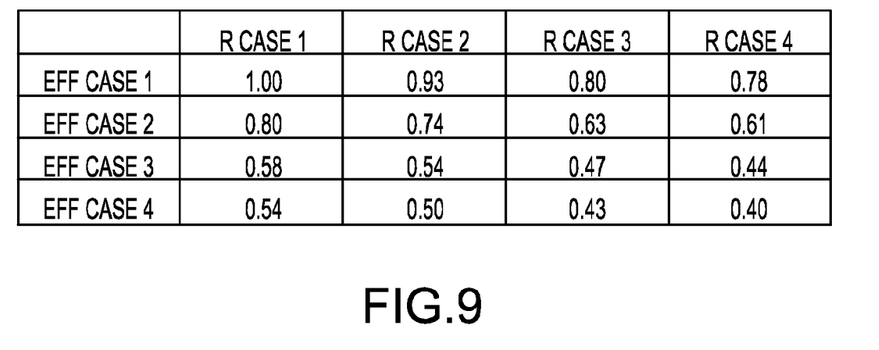
FIG. 9 summarizes system performance for the four correlation test cases in FIG. 4 and the four efficiency test cases in FIG. 5.

FIG. 9 summarizes system performance for the four correlation test cases in FIG. 4 and the four efficiency test cases in FIG. 5. The table expresses system performance using median capacity loss as a single figure of merit which accounts for the combined effect of antenna correlation matrix and distribution of antenna efficiencies in the receive antennas."

Figure 10:
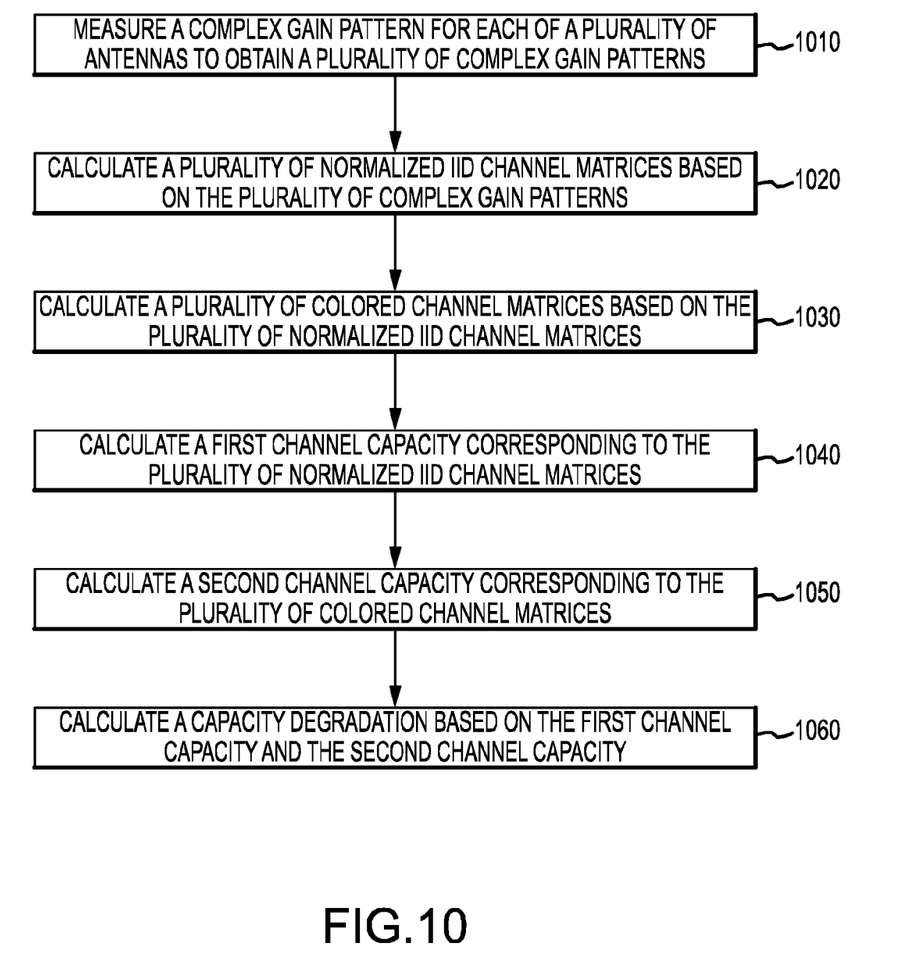
FIG. 10 illustrates an example flow diagram for determining radiated performance of multiple antennas in a wireless system on the basis of capacity degradation.

FIG. 10 illustrates an example flow diagram for determining radiated performance of multiple antennas in a wireless system on the basis of capacity degradation. In block 1010, measure a complex gain pattern for each of a plurality of antennas to obtain a plurality of complex gain patterns. In one example, the step in block 1010 is performed by an antenna measurement unit. In block 1020, calculate a plurality of normalized IID channel matrices based on the plurality of complex gain patterns. In one example, the plurality of normalized IID channel matrices is associated with a Rayleigh fading channel. In another example, the plurality of normalized IID channel matrices is associated with a Rician fading channel. In block 1030, calculate a plurality of colored channel matrices based on the plurality of normalized IID channel matrices. In block 1040, calculate a first channel capacity corresponding to the plurality of normalized IID channel matrices, for example, assuming a system appropriate signal-to-noise (SNR) value. In block 1050, calculate a second channel capacity corresponding to the plurality of colored channel matrices, for example, assuming the same system appropriate signal-to-noise (SNR) value as in block 1040. In block 1060, calculate a capacity degradation based on the first channel capacity and the second channel capacity. In one example, one or more of the steps in FIG. 10 are performed by a measurement processor. In one aspect, the antenna measurement unit and the measurement processor are part of a testing apparatus which is external to the plurality of antennas.

One skilled in the art would understand that the steps disclosed in the example flow diagram in FIG. 10 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 11:
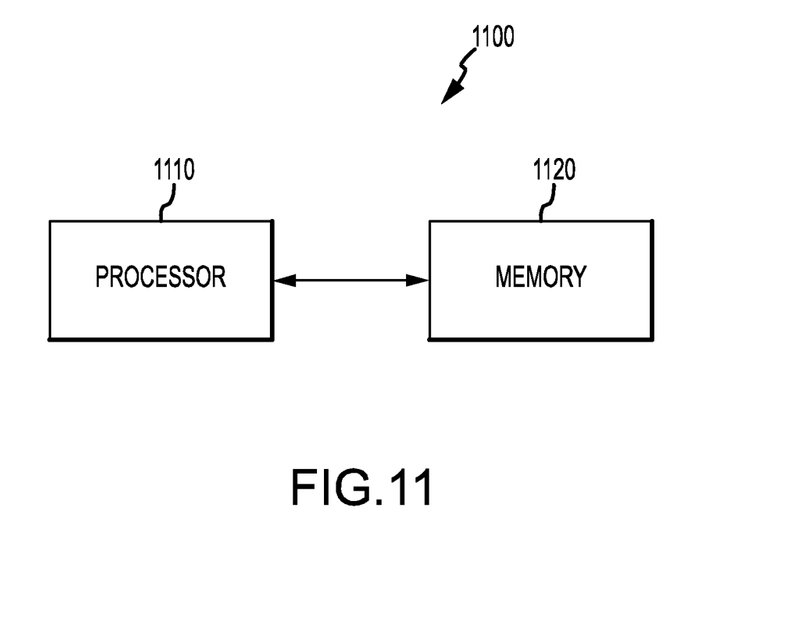
FIG. 11 illustrates an example of a device comprising a processor in communication with a memory for executing the processes for determining radiated performance of multiple antennas in a wireless system on the basis of capacity degradation.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 11 illustrates an example of a device 1100 comprising a processor 1110 in communication with a memory 1120 for executing the processes for determining radiated performance of multiple antennas in a wireless system on the basis of capacity degradation. In one example, the device 1100 is used to implement the algorithm illustrated in FIG. 10. In one aspect, the memory 1120 is located within the processor 1110. In another aspect, the memory 1120 is external to the processor 1110. In one aspect, the processor includes circuitry for implementing or performing the various flow diagrams, logical blocks and/or modules described herein.

Figure 12:
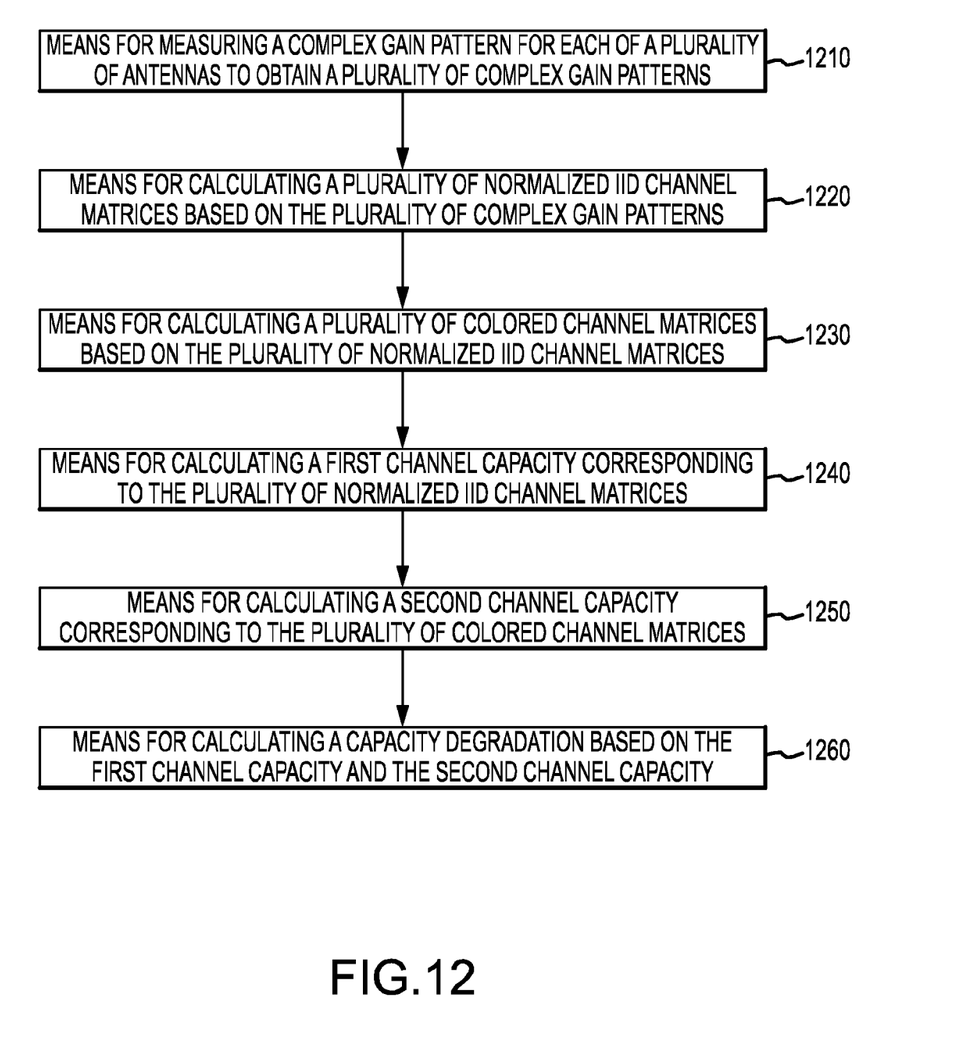
FIG. 12 illustrates an example of a device suitable for determining radiated performance of multiple antennas in a wireless system on the basis of capacity degradation.

FIG. 12 illustrates an example of a device 1200 suitable for determining radiated performance of multiple antennas in a wireless system on the basis of capacity degradation. In one aspect, the device 1200 is implemented by at least one processor comprising one or more modules configured to provide different aspects of determining radiated performance of multiple antennas in a wireless system on the basis of capacity degradation as described herein in blocks 1210, 1220, 1230, 1240, 1250 and 1260. For example, each module comprises hardware, firmware, software, or any combination thereof. In one aspect, the device 1200 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for determining radiated performance of multiple antennas in a wireless system on the basis of capacity degradation comprising:
    calculating a plurality of normalized IID channel matrices based on a plurality of complex gain patterns;
    calculating a plurality of colored channel matrices based on the plurality of normalized IID channel matrices;
    calculating a first channel capacity corresponding to the plurality of normalized IID channel matrices;
    calculating a second channel capacity corresponding to the plurality of colored channel matrices; and
    calculating a capacity degradation based on the first channel capacity and the second channel capacity.

2. The method of claim 1 wherein the plurality of normalized IID channel matrices is associated with a Rayleigh fading channel.

3. The method of claim 1 wherein the plurality of normalized IID channel matrices is associated with a Rician fading channel.

4. The method of claim 1 further comprising measuring a complex gain pattern for each of a plurality of antennas to obtain the plurality of complex gain patterns.

5. An apparatus comprising a processor and a memory, the memory containing program code executable by the processor for performing the following:
    calculating a plurality of normalized IID channel matrices based on a plurality of complex gain patterns;
    calculating a plurality of colored channel matrices based on the plurality of normalized IID channel matrices;
    calculating a first channel capacity corresponding to the plurality of normalized IID channel matrices;
    calculating a second channel capacity corresponding to the plurality of colored channel matrices; and
    calculating a capacity degradation based on the first channel capacity and the second channel capacity.

6. The apparatus of claim 5 wherein the plurality of normalized IID channel matrices is associated with a Rayleigh fading channel.

7. The apparatus of claim 5 wherein the plurality of normalized IID channel matrices is associated with a Rician fading channel.

8. The apparatus of claim 5 further comprising an antenna measurement unit for measuring a complex gain pattern for each of a plurality of antennas to obtain the plurality of complex gain patterns.

9. An apparatus for determining radiated performance of multiple antennas in a wireless system on the basis of capacity degradation comprising:
    means for calculating a plurality of normalized IID channel matrices based on a plurality of complex gain patterns;
    means for calculating a plurality of colored channel matrices based on the plurality of normalized IID channel matrices;
    means for calculating a first channel capacity corresponding to the plurality of normalized IID channel matrices;
    means for calculating a second channel capacity corresponding to the plurality of colored channel matrices; and
    means for calculating a capacity degradation based on the first channel capacity and the second channel capacity.

10. The apparatus of claim 9 wherein the plurality of normalized IID channel matrices is associated with a Rayleigh fading channel.

11. The apparatus of claim 9 wherein the plurality of normalized IID channel matrices is associated with a Rician fading channel.

12. The apparatus of claim 9 further comprising means for measuring a complex gain pattern for each of a plurality of antennas to obtain the plurality of complex gain patterns.

13. A non-transitory computer-readable medium storing a computer program, wherein execution of the computer program is for:
    calculating a plurality of normalized IID channel matrices based on a plurality of complex gain patterns;
    calculating a plurality of colored channel matrices based on the plurality of normalized IID channel matrices;
    calculating a first channel capacity corresponding to the plurality of normalized IID channel matrices;
    calculating a second channel capacity corresponding to the plurality of colored channel matrices; and
    calculating a capacity degradation based on the first channel capacity and the second channel capacity.

14. The non-transitory computer-readable medium of claim 13 wherein the plurality of normalized IID channel matrices is associated with a Rayleigh fading channel.

15. The non-transitory computer-readable medium of claim 13 wherein the plurality of normalized IID channel matrices is associated with a Rician fading channel.

16. The non-transitory computer-readable medium of claim 13 wherein execution of the computer program is also for measuring a complex gain pattern for each of a plurality of antennas to obtain the plurality of complex gain patterns.

* * * * *